US008898093B1

(12) United States Patent
Helmsen

(10) Patent No.: US 8,898,093 B1
(45) Date of Patent: Nov. 25, 2014

(54) SYSTEMS AND METHODS FOR ANALYZING DATA USING DEEP BELIEF NETWORKS (DBN) AND IDENTIFYING A PATTERN IN A GRAPH

(75) Inventor: John Helmsen, Fairfax, VA (US)

(73) Assignee: The Boeing Company, Chicago, IL (US)

( * ) Notice: Subject to any disclaimer, the term of this patent is extended or adjusted under 35 U.S.C. 154(b) by 271 days.

(21) Appl. No.: 13/531,898

(22) Filed: Jun. 25, 2012

(51) Int. Cl.
*G06F 15/18* (2006.01)

(52) U.S. Cl.
USPC .......................................................... 706/12

(58) Field of Classification Search
USPC ..................................................... 706/12, 45
See application file for complete search history.

(56) References Cited

PUBLICATIONS

Lee, H., Grosse, R., Ranganath, R., & Ng, A. Y. (Jun. 2009). Convolutional deep belief networks for scalable unsupervised learning of hierarchical representations. In Proceedings of the 26th Annual International Conference on Machine Learning (pp. 609-616). ACM.*
Arel, I., Rose, D. C., & Karnowski, T. P. (2010). Deep machine learning-13 a new frontier in artificial intelligence research [research frontier]. Computational Intelligence Magazine, IEEE, 5(4), 13-18.*
Rose, D. C., Arel, I., Karnowski, T. P., & Paquit, V. C. (May 2010). Applying deep-layered clustering to mammography image analytics. In Biomedical Sciences and Engineering Conference (BSEC), 2010 (pp. 1-4). IEEE.*
Neuhaus, M. et al; Edit Distance-Based Kernel Functions for Structural Pattern Classification; The Journal of Patent Recognition Society; 2006; pp. 1852-1863; vol. 39; Elsevier Ltd.
Vishwanathan, S.V.N. et al; Graph Kernels; Journal of Machine Learning Research; 2010; pp. 1201-1242; vol. 11.
Hinton, G. et al.; The "Wake-Sleep" Algorithm for Unsupervised Neural Networks; Science; May 26, 1995; pp. 1158-1161; vol. 268.
Riesen, K. et al.; Approximate Graph Edit Distance Computation by Means of Bipartite Graph Matching; Image and Vision Computing; 2009; pp. 950-959; vol. 27; Elsevier Ltd.
Lee, H. et al.; Convolutional Deep Belief Networks for Scalable Unsupervised Learning of Hierarchial Representations; Proceedings of the 26th International Conference on Machine Learning; Montreal, Canada, 2009; 8 pages.
Micheli, A.; Neural Network for Graphs: A Contextual Constructive Approach; IEEE Transaction on Neural Networks; Mar. 2009; pp. 498-511; vol. 20, No. 3.
Scarselli, F. et al.; The Graph Neural Network Model; IEEE Transactions on Neural Networks; 2009; 32 pages; vol. 20.
Hinton, G. et al.; A Fast Learning Algorithm for Deep Belief Nets; Neural Computation; 2006; pp. 1527-1554; vol. 18.
Khan, A. et al.; Neighborhood Based Fast Graph Search in Large Networks; SIGMOD ' 11; Jun. 12-16, 2011; 12 pages; Athens, Greece.

(Continued)

*Primary Examiner* — David Vincent
(74) *Attorney, Agent, or Firm* — Armstrong Teasdale LLP

(57) ABSTRACT

A method for analyzing data is provided. The method includes generating, using a processing device, a graph from raw data, the graph including a plurality of nodes and edges, deriving, using the processing device, at least one label for each node using a deep belief network, and identifying, using the processing device, a predetermined pattern in the graph based at least in part on the labeled nodes.

20 Claims, 4 Drawing Sheets

(56) References Cited

PUBLICATIONS

Salakhutdinov, R. et al.; On the Quantitative Analysis of Deep Belief Networks; Proceedings of the 25th International Conference on Machine Learning; Helsinki, Finland; 2008; 8 pages.

Tian, Y. et al.; Tale: A Tool for Approximate Large Graph Matching; International Conference on Date Engineering; 2008; 10 pages.

Mongiovi, M. et al.; SIGMA: A Set-Cover-Based Inexact Graph Matching Algorithm; Journal of Bioinformatics and Computational Biology; 2010; pp. 199-218; Vol. 8, No. 2; Imperial College Press.

Tong, H. et al.; Fast Best-Effort Pattern Matching in Large Attributed Graphs; International Conference on Knowledge and Data Discovery; 2007; 10 pages; San Jose, CA.

Bengio, Y.; Learning Deep Architecture for AI; Foundations and Trends in Machine Learning; 2009; pp. 1-127; vol. 2, No. 1.

* cited by examiner

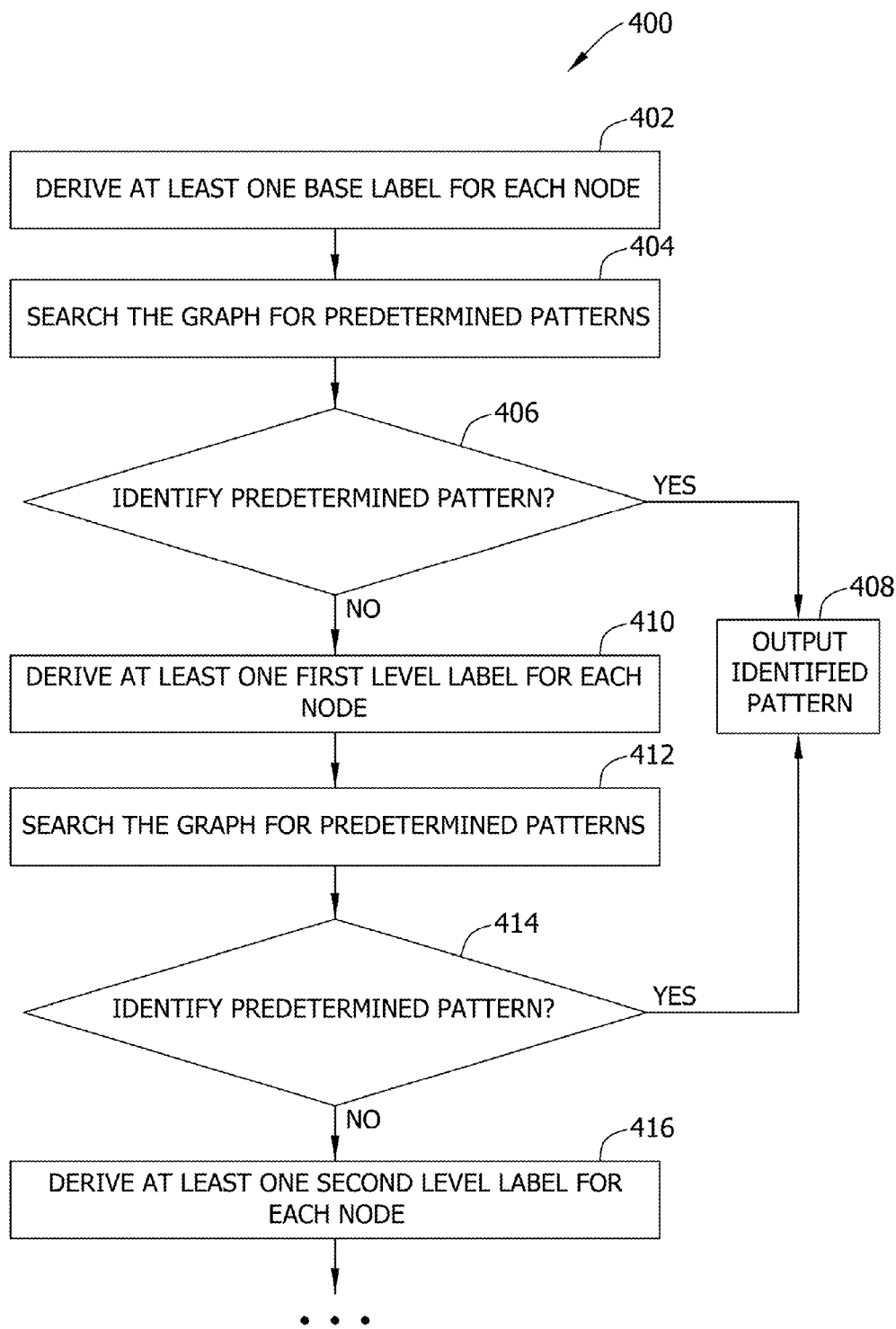

SYSTEMS AND METHODS FOR ANALYZING DATA USING DEEP BELIEF NETWORKS (DBN) AND IDENTIFYING A PATTERN IN A GRAPH

BACKGROUND OF THE INVENTION

The field of the disclosure relates generally to data analysis, and more specifically, to systems and methods for identifying patterns in data using deep belief networks.

In various applications, raw data from a plurality of sensors and/or sources is organized and analyzed to extract useful information and/or intelligence. Because the information may be distributed among multiple sensors and/or sources, the data may be organized in the form of a graph that includes nodes and edges. Structures of interest (i.e. patterns) indicative of certain occurrences and/or instances may be identified using the nodes and the edges.

Complex social and information networks that include the raw data may include missing and/or incomplete information. Accordingly, to extract useful information and/or intelligence from such networks (i.e., the graph), data analysts (i.e., human operators) attempt to characterize the networks, locate common patterns in the networks, and query the networks for specific sub-structures. However, because such networks may be relatively large, data analysts typically utilize machine assistance to efficiently process the data.

To process the data effectively, the machine assistant generally requires some level of training. This training may be performed by the data analyst, or the system may be able to train itself. In general, the less intelligent the machine assistant, the more training must be performed by the data analyst. Accordingly, at least some known machine assistants require extensive training from the data analyst. Further, at least some known data analysis systems require the data analyst to constantly monitor operation of the machine assistant. Moreover, at least some known data analysis systems require that the data analyst have relatively sophisticated programming and artificial intelligence experience to effectively operate and train the machine assistant.

BRIEF DESCRIPTION

In one aspect, a method for analyzing data is provided. The method includes generating, using a processing device, a graph from raw data, the graph including a plurality of nodes and edges, deriving, using the processing device, at least one label for each node using a deep belief network, and identifying, using the processing device, a predetermined pattern in the graph based at least in part on the labeled nodes.

In another aspect, a data analysis system is provided. The data analysis system includes a memory device configured to store raw data, and a processing device in communication with said memory device. The processing device is configured to generate a graph from the raw data, the graph including a plurality of nodes and edges, derive at least one label for each node using a deep belief network, and identify a predetermined pattern in the graph based at least in part on the labeled nodes.

In yet another aspect, an analyst assistant embodied in a computer readable medium is provided. The analyst assistant is configured to generate a graph from raw data, the graph including a plurality of nodes and edges, derive at least one label for each node using a deep belief network, and identify a predetermined pattern in the graph based at least in part on the labeled nodes.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 4 is a flowchart of an exemplary method that may be implemented to label nodes and to identify a predetermined pattern in a graph.

DETAILED DESCRIPTION

The systems and methods described herein facilitate processing data represented as a graph. To process a graph, each node is assigned at least one label based on its content, and several layers of new labels may be created for each node based on its previous labels and/or the labels of its neighbors (i.e., nodes within a predetermined path length). By iterating this procedure, an efficient method of finding subgraphs (i.e., patterns) of interest in large graphs is achieved. The nodes are labeled utilizing Deep Belief Networks (DBNs) that have been modified to accept information from a variable number of neighbors. The DBNs can be programmed through example, perform their own feature selection, generate their own (unlabeled) training data, perform unsupervised learning, and require very few external constants to be set by the data analyst such that the system may perform most routine analysis functions with relatively little algorithmic knowledge or experience on the part of the analyst.

Technical effects of the methods and systems described herein include at least one of (a) generating a graph from raw data, the graph including a plurality of nodes and edges; (b) deriving at least one label for each node using a deep belief network; and (c) identifying a predetermined pattern in the graph based at least in part on the labeled nodes.

Figure 1:
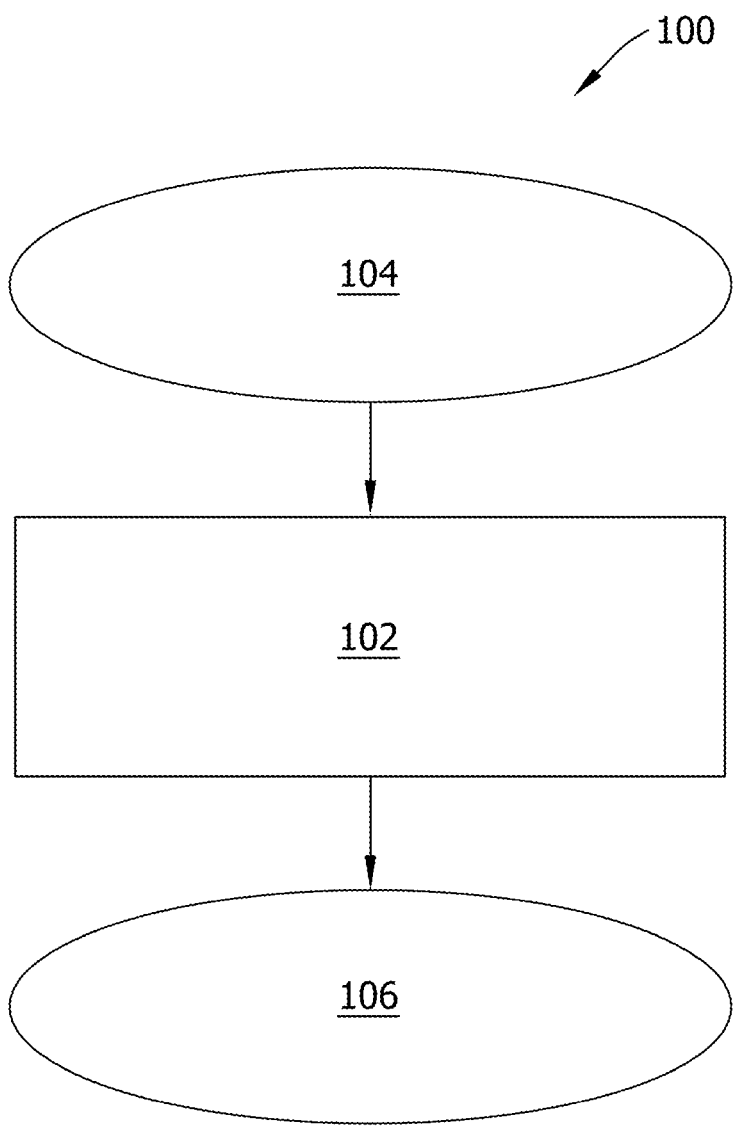
FIG. 1 is a schematic diagram of an exemplary workflow for use in analyzing data.

FIG. 1 is a diagram of an exemplary workflow 100 for use in analyzing data. During workflow 100, a data analysis system 102 receives raw data 104 as an input. Data analysis system 102 organizes and analyzes the data, as described in more detail herein, to identify one or more patterns 106. The identified patterns 106 are output from data analysis system 102.

Figure 2:
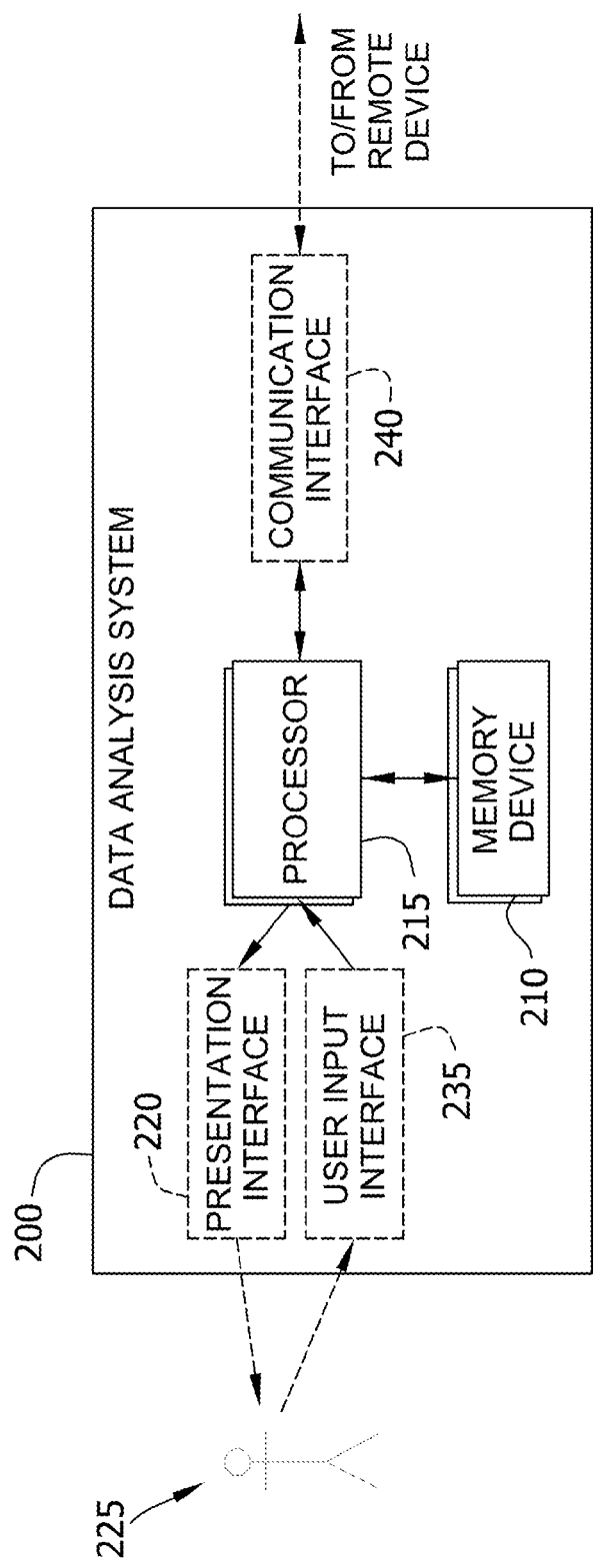
FIG. 2 is a block diagram of an exemplary data analysis system that may be used with the workflow shown in FIG. 1.

FIG. 2 is a block diagram of an exemplary data analysis system 200, such as data analysis system 102 (shown in FIG. 1), that may be used to analyze data. Data analysis system 200 includes at least one memory device 210 and a processor 215 that is coupled to memory device 210 for executing instructions. In some embodiments, executable instructions are stored in memory device 210. In the exemplary embodiment, data analysis system 200 performs one or more operations described herein by programming processor 215. For example, processor 215 may be programmed by encoding an operation as one or more executable instructions and by providing the executable instructions in memory device 210.

Processor 215 may include one or more processing units (e.g., in a multi-core configuration). Further, processor 215 may be implemented using one or more heterogeneous processor systems in which a main processor is present with secondary processors on a single chip. As another illustrative example, processor 215 may be a symmetric multi-processor system containing multiple processors of the same type. Further, processor 215 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein.

In the exemplary embodiment, memory device 210 is one or more devices that enable information such as executable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data.

In some embodiments, data analysis system 200 includes a presentation interface 220 that is coupled to processor 215. Presentation interface 220 presents information, such as application source code and/or execution events, to a user 225, such as a data analyst. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 220 includes one or more display devices.

In the exemplary embodiment, data analysis system 200 includes a user input interface 235. In the exemplary embodiment, user input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235.

In some embodiments, data analysis system 200 includes a communication interface 240 coupled to processor 215. Communication interface 240 communicates with one or more remote devices. To communicate with remote devices, communication interface 240 may include, for example, a wired network adapter, a wireless network adapter, and/or a mobile telecommunications adapter. In the exemplary embodiment, unless otherwise noted, processor 215 performs the data analysis methods described herein. Further, as described below, processor 215 utilizes deep belief networks (DBNs) to perform the data analysis methods described herein.

Figure 3:
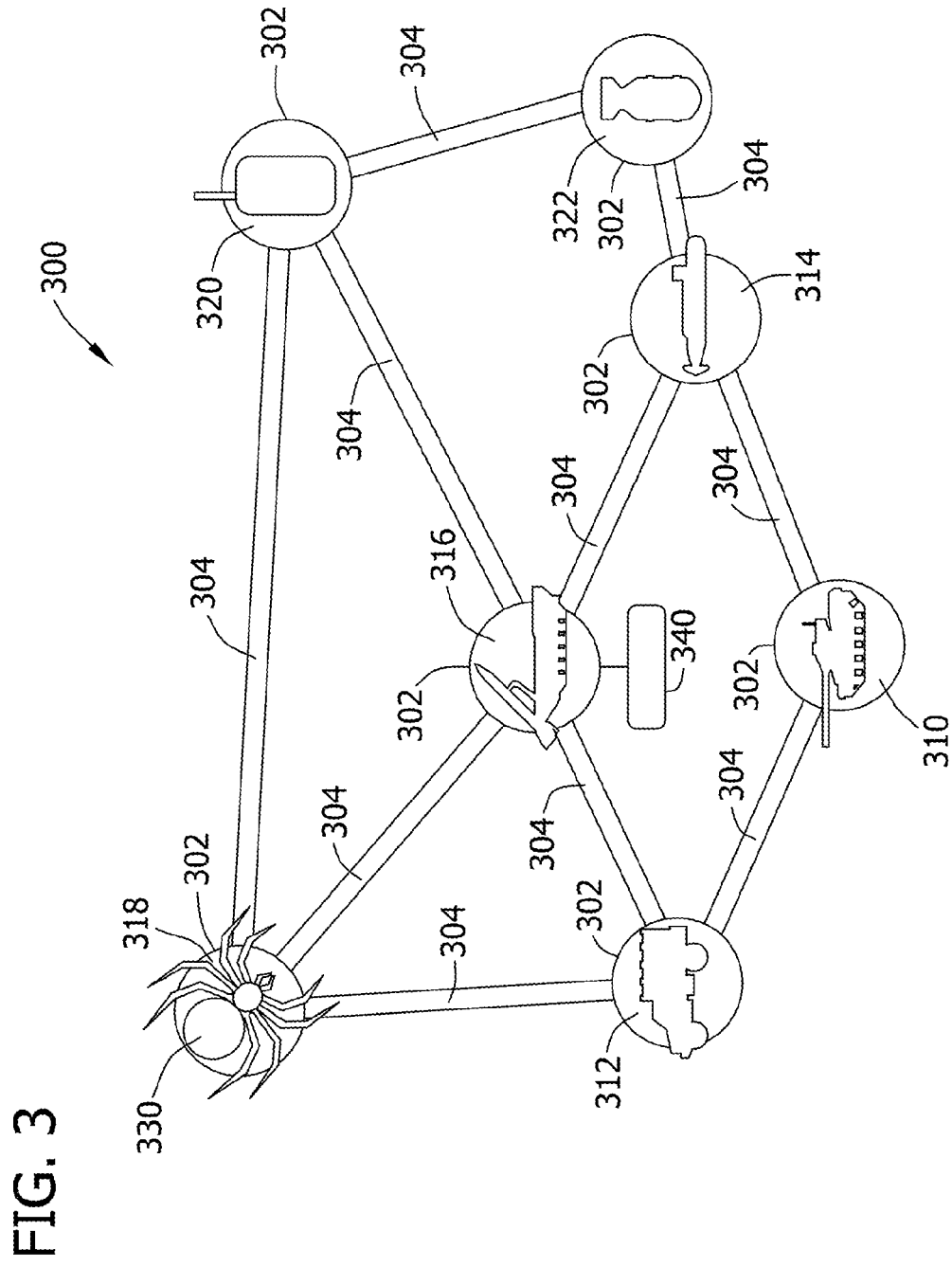
FIG. 3 is a schematic diagram of an exemplary graph that may be generated using the data analysis system shown in FIG. 2.

FIG. 3 is a schematic diagram of an exemplary graph 300 that may be generated from data, such as raw data 104 (shown in FIG. 1). In the exemplary embodiment, graph 300 is generated using a data analysis system, such as data analysis system 200 (shown in FIG. 2). Graph 300 includes a plurality of nodes 302 and edges 304. Each node 302, or object, in graph 300 represents a piece of data. The data represented by nodes 302 may be text, intelligence information, pictures, audio, RF signals, text glyphs, and/or any type of information that may be analyzed as described herein. The data is acquired from a plurality of sources and/or sensors, and may be stored, for example, on memory device 210 (shown in FIG. 2). In the exemplary embodiment, graph 300 includes a first node 310, a second node 312, a third node 314, a fourth node 316, a fifth node 318, a sixth node 320, and a seventh node 322. Alternatively, graph 300 may include any number of nodes 302.

Each edge 304 is a known, inferred, and/or potential relationship between the nodes 302 it connects. Using the methods and systems described herein, patterns may be identified from the nodes 302 and edges 304 in graph 300. For example, a potential terrorist cell may be identified by recognizing certain nodes 302 (e.g., persons, locations, events, etc.) and edges 304 (call each other, meet each other regularly, seen at a bombing, etc.). Efficient sifting through graph 300 is important to identify such patterns, especially if the exact pattern a data analyst seeks is partially obscured due to missing or incomplete data.

In the exemplary embodiment, graph 300 is generated by an analyst assistant 330, represented as a spider, searching raw data 104 (shown in FIG. 1). Analyst assistant 330 is implemented as part of processor 215 (shown in FIG. 2), and operates according to the programming of processor 215. Specifically, analyst assistant 330 utilizes deep belief networks (DBNs) to generate and analyze graph 300. DBNs are a particular type of neural network that is well-equipped to operate on a wide range of inputs. In the exemplary embodiment, the DBNs utilized in the systems and methods described herein are convolutional DBNs. By searching raw data 104, analyst assistant 330 uses DBNs to build graph 300 in an unstructured manner. Since DBN technology is relatively effective at finding patterns in unstructured data and building networks from unstructured data, such as raw data 104, graph 300 may be generated with relatively little to no human intervention.

As used herein, "deep belief networks" are probabilistic generative models that are composed of multiple layers of stochastic, latent variables. In the exemplary embodiment, the latent variables have binary values and may be referred to as hidden units and/or feature detectors. The top two layers of a DBN have undirected, symmetric connections between them and they form an associative memory. Each of the lower layers of the DBN receives top-down, directed connections from an above layer. The states of the units in the lowest layer represent a data vector.

DBNs have a number of advantageous properties. For example, within DBNs, there is a layer-by-layer methodology for learning top-down, generative weights that determine how the latent variables in one layer depend on latent variables in an above layer. After learning the generative weights, the values of the latent variables in one or more layers layer may be inferred by a single, bottom-up pass that starts with an observed data vector in the bottom layer and uses the generative weights in a top-down direction. In the exemplary embodiment, DBNs are learned one layer at a time by treating values of latent variables in one layer, when they are being inferred from data, as data for training the next layer. This enables relatively efficient, greedy learning, which may be followed be or used in combination with other training and/or learning methodologies that adjust the one or more of the generative weights to improve performance of the whole network.

Discriminative fine-tuning of the DBN may be performed by adding a final layer of variables that represent the desired outputs and backpropagating error derivatives. In embodiments where networks with multiple hidden layers are applied to structured input data, such as images, backpropagation may be improved if feature detectors in the hidden layers are initialized by learning a DBN that models the structure in the input data. As noted above, in the exemplary embodiment, the DBNs utilized in the systems and methods described herein are convolutional DBNs. Convolutional DBNs employ convolution windowing as part of the DBN to scan large sections of data with a smaller network.

In the exemplary embodiment, to generate graph 300, analyst assistant 330 may use a generative capability to create new instances of existing nodes 302. Analyst assistant 330 may also be asked to use its best judgment to complete otherwise incomplete information in raw data 104. Notably, by observing how analyst assistant 330 creates new instances of nodes 302 and/or completes incomplete information, user 225 (shown in FIG. 2) can inspect the current thinking of analyst assistant 330 without inspecting programming details of the DBNs. For example, graph 300 may be displayed on presentation interface 220 (shown in FIG. 2) for user 225 to observe.

For each node 302 in graph 300, analyst assistant 330 uses DBNs to generate one or more labels 340. For clarity, only one label 340 is shown in FIG. 3. However, in the exemplary embodiment, labels 340 are generated for each node 302, and each node may include a plurality of labels 340, as described in detail herein. Labels 340 are additional pieces of information associated with a particular node. Using generated labels 340, analyst assistant 330 may identify one or more patterns in graph 300.

FIG. 4 is a flowchart of an exemplary method 400 that may be implemented to label nodes 302 and to identify a predetermined pattern in graph 300. Analyst assistant 330 derives 402 at least one base label for each node 302. To derive 402 the at least one base label for a given node 302, analyst assistant 330 only evaluates the given node 302.

With base labels generated for each node 302, analyst assistant 330 searches 404 graph 300 to identify one or more predetermined patterns (also referred to herein as subgraphs) within graph 300. Specifically, analyst assistant 330 utilizes the base labels to aid in attempting to identify the predetermined patterns. In the exemplary embodiment, the pattern is structure of nodes 302, edges 304, and/or labels 340 indicative of a certain occurrence or entity. For example, a potential terrorist cell (i.e., the occurrence/entity) may be identified by recognizing certain nodes 302 (e.g., persons, locations, events, etc.), edges 304 (call each other, meet each other regularly, seen at a bombing, etc.), and labels 340 (e.g., a person's background, a person's location, a location's vulnerability, etc.). Predetermined patterns may be created by user 225 via user input interface 235, or may be created by analyst assistant 330 from learning and/or training of analyst assistant 330.

It is relatively unlikely that candidate patterns located in graph 300 will be an exact match to the predetermined pattern that user 225 is interested in. Accordingly, in the exemplary embodiment, analyst assistant 330 identifies 406 a predetermined pattern in graph 300 when a correlation between the predetermined pattern and a candidate pattern located in graph 300 is above a predetermined threshold. For example, analyst assistant 330 may identify 406 a predetermined pattern if the correlation between the predetermined pattern and the candidate pattern is greater than or equal to 95%. Because analyst assistant 330 does not require an exact correlation (i.e., a 100% match), analyst assistant 330 can identify 406 one or more predetermined patterns in graph 300 relatively quickly.

If analyst assistant 330 identifies 406 a pattern in graph 300 without generating additional labels 340, analyst assistant 330 outputs 408 the identified pattern to notify user 225 (shown in FIG. 2). For example, processor 215 may cause presentation interface 220 (both shown in FIG. 2) to display the identified pattern to user 225.

If analyst assistant 330 does not identify 406 a pattern in graph 300, analyst assistant 330 derives 410 first level labels using DBNs. First level labels are derived 410 for each particular node 302 by looking at nodes 302 and edges 304 within one path length of the particular node 302. In the exemplary embodiment, to derive 410 first level labels, analyst assistant 330 also evaluates previously generated labels (i.e., base labels) within one path length.

As used herein, the path length is defined as the minimum number of edges 304 between two nodes 302. Accordingly, there is one path length between first node 310 and second node 312, while there are two path lengths between first node 310 and fourth node 316. Accordingly, to derive 410 first level labels for first node 310, analyst assistant 330 evaluates first node 310, second node 312, third node 314, the edge 304 connecting first and second nodes 310 and 312, the edge 304 connecting first and third nodes 310 and 314, and the base labels for first node 310, second node 312, and third node 314.

With base and first level labels generated for each node 302, analyst assistant 330 searches 412 graph 300 to identify the one or more predetermined patterns, using the base labels and first level labels to aid the identification. Similar to above, if analyst assistant 330 identifies 414 a predetermined pattern, analyst assistant 330 outputs 408 the identified pattern. If analyst assistant 330 does not identify 414 a pattern in graph 300, analyst assistant 330 derives 416 second level labels using DBNs and incrementing the path length of evaluated nodes 302 and edges 304 by one. That is, second level labels are derived 416 for each particular node 302 by looking at nodes 302 and edges 304 within two path lengths of the particular node 302. In the exemplary embodiment, to derive 416 second level labels, analyst assistant 330 also evaluates previously generated labels (i.e., base labels and first level labels) within two path lengths.

This process is repeated iteratively, until analyst assistant 330 identifies a predetermined pattern. That is, analyst assistant 330 generates labels, attempts to identify a predetermined pattern, and generates more labels (incrementing the path length by one) if no predetermined pattern is located. The more sophisticated/intelligent the DBN, the fewer passes (i.e., labeling levels) are required to identify a predetermined pattern. Accordingly, using DBNs, analyst assistant 330 derives labels for graph 300 and searches graph 300 to identify predetermined patterns in graph 300.

Because analyst assistant 330 utilizes DBNs, it is relatively easy for user 225 to test the knowledge of analyst assistant 330. In one embodiment, to test analyst assistant 330, user 225 may utilize user input interface 235 to ask analyst assistant 330 what analyst assistant 330 is looking for in the one or more predetermined patterns. For example, user 225 may ask analyst assistant 330 to provide what sort of nodes 302, edges 304, and/or labels 340 would be indicative of a terrorist cell. In another embodiment, to test knowledge of analyst assistant 330, user 225 may supply analyst assistant 330 with a plurality of labels 340, and ask analyst assistant 330 to generate nodes 302 and edges 304 of graph 300 from the supplied labels 340. In yet another embodiment, user 225 may supply a test set of data to analyst assistant 330, and observe whether analyst assistant 330 properly identifies patterns in the test data.

Moreover, because analyst assistant 330 utilizes DBNs, it is also relatively easy for user 225 to train analyst assistant 330 without user 225 having extensive programming and/or artificial intelligence experience. In one embodiment, user 225 may utilize user input interface 235 to identify a node 302, edge 304, and/or label 340 in graph 300 that is relevant to a particular pattern. Further, using user input interface 235, user 225 may create a labeled data set (e.g., a predetermined pattern) to describe information that user 225 is interested in. In the exemplary embodiment, analyst assistant 330 is also capable of unsupervised learning (i.e., training without assistance of user 225).

To implement the methods and systems described herein, existing neural network methods may be adapted to generate and/or search graph 300. For example, at least some neural network methods represent a variable number of edges 304 entering each node 302 as an evolving series via a recurrent neural network. Other neural network methods instead define a class of related neural nets which have a variable number of branches whose number is proportional to the varying size of the input, but the weights of each branch are identical.

Moreover, in some embodiments, at least one of nodes 302 in graph 300 is a pooling node. A pooling node is a particular type of DBN node which activates if one and only one of its inputs is turned on. In addition, it is only possible for one of the inputs to be turned on at one time. A stochastic softmax function is formed based on the strength of the inputs, which is used to determine the probability of input activation. Although in some embodiments, the pooling node contains a fixed number of inputs, in other embodiments, the softmax calculation for the pooling node activation probability incorporates a variable number of nodes. This approach generally requires sparsity in the lower layers of a Basic Restricted Boltzman Machine (RBM), but this has been shown to improve performance in most cases even when pooling nodes are not present. Pooling nodes can also be used for its original convolutional approach over varying distances and varying time scales.

RBM theory may be re-derived for the variable branch number approach, focusing on methods for performing weight updates using contrastive divergence, where the branch weights will all be considered tied. A wake-sleep algorithm may also be adapted to the variable branch case to allow increases in accuracy when the discriminative classes are known.

Further, methods for calculating the probability of any particular data configuration by measuring the system likelihood and calculating the partition function may be derived. Partition function calculation is a particularly strong capability that can be tractably estimated (although not tractably computed exactly) in DBNs. Knowledge of the partition function allows a calculation of the trained system's probability estimate of the training set and a probability estimate of the system on a verification set. This enables an estimate of the quality of the system, since if it is clustered tightly around the verification set, then the training that has been performed is quite good, and provides a more accurate measure of training success than is possible with simple percent correct estimates.

The embodiments described herein enable data to be processed that is represented as a graph. To process a graph, each node is assigned at least one label based on its content, and several layers of new labels may be created for each node based on its previous labels and/or the labels of its neighbors (i.e., nodes within a predetermined path length). Through iteration, an efficient method of finding subgraphs (i.e., patterns) of interest in large graphs is achieved. The nodes are labeled utilizing Deep Belief Networks (DBNs) that have been modified to accept information from a variable number of neighbors. The DBNs can be programmed through example, perform their own feature selection, generate their own (unlabeled) training data, perform unsupervised learning, and require very few external constants to be set by the data analyst such that the system may perform most routine analysis functions with relatively little algorithmic knowledge or experience on the part of the analyst.

As compared to at least some known data analysis systems, the systems and methods described herein reduce the time and/or effort expended by an operator (i.e., data analyst) in operating a data analysis system. That is, the methods and systems described herein require relatively little training and/or monitoring by an operator. Further, as compared to at least some known data analysis systems, by utilizing deep belief networks, the methods and systems described herein are more accurate and/or more efficient in identifying patterns in a wide variety on data. Moreover, the methods and systems described herein do not require an operator to have extensive programming and/or artificial intelligence experience.

The embodiments described herein may utilize executable instructions embodied in a non-transitory computer readable medium, including, without limitation, a storage device or a memory area of a computing device. Such instructions, when executed by one or more processors, cause the processor(s) to perform at least a portion of the methods described herein. As used herein, a "storage device" is a tangible article, such as a hard drive, a solid state memory device, and/or an optical disk that is operable to store data.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for analyzing data, said method comprising:
generating, using an analyst assistant, a graph from raw data, the graph including a plurality of nodes and edges, wherein each node represents a piece of data and each edge represents a relationship between connected nodes;
deriving, using the analyst assistant, at least one label for each node using a deep belief network; and
identifying, using the analyst assistant, a predetermined pattern in the graph based at least in part on the labeled nodes.

2. A method in accordance with claim 1, wherein deriving at least one label comprises deriving at least one base label for a node by evaluating the node.

3. A method in accordance with claim 2, wherein deriving at least one label further comprises deriving at least one first level label for the node by evaluating all nodes, edges, and previously derived labels within one path length of the nod; wherein path length is defined as a minimum number of edges between two nodes.

4. A method in accordance with claim 3, wherein deriving at least one label further comprises deriving at least one second level label for the node by evaluating all nodes, edges, and previously derived labels within two path lengths of the node.

5. A method in accordance with claim 1, wherein deriving at least one label comprises deriving at least one label using a convolutional deep belief network.

6. A method in accordance with claim 1, wherein identifying a predetermined pattern comprises:
locating a candidate pattern in the graph; and
identifying the candidate pattern as the predetermined pattern if a correlation between the candidate pattern and the predetermined pattern is above a predetermined threshold.

7. A method in accordance with claim 1, further comprising training the analyst assistant to identify the predetermined pattern.

8. A data analysis system comprising:
a memory device configured to store raw data; and
an analyst assistant in communication with said memory device and configured to:
generate a graph from the raw data, the graph including a plurality of nodes and edges, wherein each node represents a piece of data and each edge represents a relationship between connected nodes;
derive at least one label for each node using a deep belief network; and
identify a predetermined pattern in the graph based at least in part on the labeled nodes.

9. A data analysis system in accordance with claim 8, wherein to derive at least one label, said analyst assistant is configured to derive at least one base label for a node by evaluating the node.

10. A data analysis system in accordance with claim 9, wherein to derive at least one label, said analyst assistant is further configured to derive at least one first level label for the node by evaluating all nodes, edges, and previously derived labels within one path length of the node, wherein path length is defined as a minimum number of edges between two nodes.

11. A data analysis system in accordance with claim 10, wherein to derive at least one label, said analyst assistant is further configured to derive at least one second level label for the node by evaluating all nodes, edges, and previously derived labels within two path lengths of the node.

12. A data analysis system in accordance with claim 8, wherein to derive at least one label, said analyst assistant is configured to derive at least one label using a convolutional deep belief network.

13. A data analysis system in accordance with claim 8, further comprising a presentation interface configured to display the identified predetermined pattern to a user.

14. A data analysis system in accordance with claim 8, further comprising a user input interface configured to receive an input from a user that defines the predetermined pattern to be identified.

15. An analyst assistant embodied in a non-transitory computer readable medium, said analyst assistant configured to:
generate a graph from raw data, the graph including a plurality of nodes and edges, wherein each node represents a piece of data and each edge represents a relationship between connected nodes;
derive at least one label for each node using a deep belief network; and
identify a predetermined pattern in the graph based at least in part on the labeled nodes.

16. An analyst assistant in accordance with claim 15, wherein to derive at least one label, said analyst assistant is configured to derive at least one base label for a node by evaluating the node.

17. An analyst assistant in accordance with claim 16, wherein to derive at least one label, said analyst assistant is further configured to derive at least one first level label for the node by evaluating all nodes, edges, and previously derived labels within one path length of the node, wherein path length is defined as a minimum number of edges between two nodes.

18. An analyst assistant in accordance with claim 17, wherein to derive at least one label, said analyst assistant is further configured to derive at least one second level label for the node by evaluating all nodes, edges, and previously derived labels within two path lengths of the node.

19. An analyst assistant in accordance with claim 15, wherein said analyst assistant is further configured to generate the predetermined pattern based on previous training.

20. An analyst assistant in accordance with claim 15, wherein to identify the predetermined pattern, said analyst assistant is configured to:
locate a candidate pattern in the graph; and
identify the candidate pattern as the predetermined pattern if a correlation between the candidate pattern and the predetermined pattern is above a predetermined threshold.

* * * * *